(12) United States Patent
Sherrard

(10) Patent No.: US 10,740,401 B2
(45) Date of Patent: Aug. 11, 2020

(54) SYSTEM FOR THE AUTOMATED SEMANTIC ANALYSIS PROCESSING OF QUERY STRINGS

(71) Applicant: LOCAL KNOWLEDGE-APP PTY LTD, Duffy, ACT (AU)

(72) Inventor: Alex Sherrard, Duffy (AU)

(73) Assignee: Local Knowledge-APP Pty Ltd, Duffy (AU)

(*) Notice: Subject to any disclaimer, the term of this patent is extended or adjusted under 35 U.S.C. 154(b) by 87 days.

(21) Appl. No.: 16/308,773

(22) PCT Filed: Jun. 12, 2017

(86) PCT No.: PCT/AU2017/050582
§ 371 (c)(1),
(2) Date: Dec. 10, 2018

(87) PCT Pub. No.: WO2017/210753
PCT Pub. Date: Dec. 14, 2017

(65) Prior Publication Data
US 2019/0258676 A1 Aug. 22, 2019

(30) Foreign Application Priority Data
Jun. 10, 2016 (AU) .............................. 2016902263

(51) Int. Cl.
*G06F 16/9032* (2019.01)
*G06F 16/9035* (2019.01)
(Continued)

(52) U.S. Cl.
CPC .... *G06F 16/90332* (2019.01); *G06F 16/9035* (2019.01); *G06F 40/20* (2020.01);
(Continued)

(58) Field of Classification Search
CPC .. G06F 16/90332; G06F 40/284; G06F 40/35; G06F 40/30; G06F 40/20; G06F 16/9035; G06F 16/3344; G06N 20/00
See application file for complete search history.

(56) References Cited

U.S. PATENT DOCUMENTS 5,519,608 A * 5/1996 Kupiec ............... G06F 16/3329
704/9
5,696,962 A * 12/1997 Kupiec ............... G06F 16/3338
(Continued)

OTHER PUBLICATIONS

Written Opinion of the ISA, dated Sep. 6, 2017 from PCT Application No. PCT/AU2017/050582.
(Continued)

*Primary Examiner* — Yogeshkumar Patel
(74) *Attorney, Agent, or Firm* — Innovation Capital Law Group, LLC; Vic Lin

(57) ABSTRACT

There is generally provided a hosted question-and-answer system utilising machine learning semantic analysis and other computational techniques including to intelligently optimise query uniformity, automate answering and optimise answer quality. In one form, there is provided a system comprising: an interface for receiving a query string from an electronic device; a query semantic correlator controller configured for: generating a query semantic representation of the query string; and correlating the query semantic representation with earlier query semantic representations, and if a matching query semantic representation is found, sending a query string associated with the matching query semantic representation to the electronic device; an answer semantic correlator controller configured for: correlating the query semantic representation with earlier answer semantic representations, and if a matching answer semantic representation is found, sending an answer string associated with the matching answer semantic representation to the elec-
(Continued)

tronic device; and a profile correlator controller configured for: if no matching answer semantic representation is found, correlating the query semantic representation with user profile data representations, and if a matching user profile data representation is found, sending the query string to an electronic device associated with a user profile associated with the matching user profile data representation.

17 Claims, 2 Drawing Sheets

(51) Int. Cl.
    *G06N 20/00*     (2019.01)
    *G06F 40/20*     (2020.01)
    *G06F 40/30*     (2020.01)
    *G06F 40/35*     (2020.01)
    *G06F 40/284*     (2020.01)

(52) U.S. Cl.
    CPC ............ *G06F 40/284* (2020.01); *G06F 40/30* (2020.01); *G06F 40/35* (2020.01); *G06N 20/00* (2019.01)

(56) References Cited

U.S. PATENT DOCUMENTS

| | | | | |
|---|---|---|---|---|
| 6,745,161 | B1* | 6/2004 | Arnold | G06F 16/3338 704/7 |
| 7,107,218 | B1* | 9/2006 | Preston | G06F 16/3344 704/270 |
| 7,313,513 | B2* | 12/2007 | Kinder | G06F 40/20 704/1 |
| 7,725,321 | B2* | 5/2010 | Bennett | G06F 16/3344 704/257 |
| 8,275,803 | B2* | 9/2012 | Brown | G06F 16/334 707/802 |
| 9,280,610 | B2* | 3/2016 | Gruber | G06F 16/9535 |
| 9,367,608 | B1* | 6/2016 | Zhang | G06F 16/35 |
| 9,940,370 | B2* | 4/2018 | Bastide | G06F 16/2379 |
| 10,108,673 | B2* | 10/2018 | Allen | G06F 16/2457 |
| 10,133,729 | B2* | 11/2018 | He | G06N 3/0445 |
| 10,133,808 | B2* | 11/2018 | Brown | G06F 16/3329 |
| 10,146,751 | B1* | 12/2018 | Zhang | G06F 16/313 |
| 10,275,453 | B2* | 4/2019 | Bennett | G06F 40/289 |
| 10,331,684 | B2* | 6/2019 | Chaubal | G06F 16/345 |
| 10,417,266 | B2* | 9/2019 | Patel | G06F 40/211 |
| 10,417,581 | B2* | 9/2019 | Agarwalla | G06F 40/30 |
| 10,489,393 | B1* | 11/2019 | Mittal | G10L 15/265 |
| 2003/0126136 | A1* | 7/2003 | Omoigui | H04L 29/06 |
| 2004/0030556 | A1* | 2/2004 | Bennett | G06F 40/20 704/270 |
| 2004/0117189 | A1* | 6/2004 | Bennett | G09B 7/00 704/270.1 |
| 2005/0080614 | A1* | 4/2005 | Bennett | G06F 40/30 704/9 |
| 2006/0212433 | A1* | 9/2006 | Stachowiak | G06F 16/3344 |
| 2009/0100045 | A1* | 4/2009 | Feng | G06F 16/90335 |
| 2009/0292687 | A1* | 11/2009 | Fan | G06N 5/04 |
| 2010/0070448 | A1* | 3/2010 | Omoigui | H01L 27/14647 706/47 |
| 2010/0228540 | A1* | 9/2010 | Bennett | G09B 5/04 704/9 |
| 2010/0235341 | A1* | 9/2010 | Bennett | G06F 16/3344 707/706 |
| 2011/0125734 | A1* | 5/2011 | Duboue | G09B 7/00 707/723 |
| 2011/0257963 | A1* | 10/2011 | Zuev | G06F 40/30 704/9 |
| 2011/0270607 | A1* | 11/2011 | Zuev | G06F 16/3344 704/9 |
| 2011/0301941 | A1* | 12/2011 | De Vocht | G06F 40/216 704/9 |
| 2012/0192280 | A1* | 7/2012 | Venkatakrishnan | G06F 21/6227 726/25 |
| 2012/0239378 | A1* | 9/2012 | Parfentieva | G06F 40/30 704/4 |
| 2012/0265531 | A1* | 10/2012 | Bennett | G06F 40/42 704/254 |
| 2012/0271627 | A1* | 10/2012 | Danielyan | G06F 40/284 704/9 |
| 2012/0272164 | A1* | 10/2012 | Polonsky | G06F 16/3329 715/753 |
| 2013/0041652 | A1* | 2/2013 | Zuev | G06F 40/268 704/8 |
| 2013/0054612 | A1* | 2/2013 | Danielyan | G06F 40/284 707/741 |
| 2013/0246046 | A1* | 9/2013 | Fan | G06F 40/30 704/9 |
| 2013/0246327 | A1* | 9/2013 | Tabrizi | G06Q 30/01 706/50 |
| 2014/0006012 | A1* | 1/2014 | Zhou | G06F 16/3344 704/9 |
| 2014/0101171 | A1* | 4/2014 | Danielyan | G06F 40/268 707/749 |
| 2014/0129212 | A1* | 5/2014 | Danielyan | G06F 16/41 704/9 |
| 2015/0044660 | A1* | 2/2015 | Byron | G09B 7/00 434/362 |
| 2015/0161106 | A1* | 6/2015 | Barbetta | G06F 40/40 434/362 |
| 2015/0193506 | A1* | 7/2015 | Bastide | G06F 16/90332 707/722 |
| 2015/0310571 | A1* | 10/2015 | Brav | G06Q 10/00 705/311 |
| 2016/0140236 | A1* | 5/2016 | Estes | G06F 16/248 707/709 |
| 2016/0170982 | A1* | 6/2016 | Djuric | G06F 16/353 707/740 |
| 2016/0203130 | A1* | 7/2016 | Roque | G06F 16/93 707/741 |
| 2016/0357851 | A1* | 12/2016 | Perkins | G06F 16/31 |
| 2017/0235848 | A1* | 8/2017 | Van Dusen | G06F 16/904 705/12 |
| 2017/0255862 | A1* | 9/2017 | Li | G06N 20/00 |
| 2019/0213185 | A1* | 7/2019 | Arroyo | G06F 16/245 |

OTHER PUBLICATIONS

Written Opinion of the IPEA, dated Feb. 8, 2018 from PCT Application No. PCT/AU2017/050582.
International Search Report, dated Sep. 6, 2017 from PCT Application No. PCT/AU2017/050582.

* cited by examiner

SYSTEM FOR THE AUTOMATED SEMANTIC ANALYSIS PROCESSING OF QUERY STRINGS

FIELD OF THE INVENTION

This invention relates generally to a hosted question-and-answer system utilising machine learning semantic analysis and other computational techniques including to intelligently optimise query uniformity, automate answering and optimise answer quality.

BACKGROUND OF THE INVENTION

Question-and-answer Internet platforms exist in the prior art such as, for example, Yahoo Answers wherein users may post publicly viewable queries for answering by registered users.

We have identified that such platforms are deficient in several respects including query duplication, appropriate answer finding inability and answer quality.

The present invention seeks to provide a system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a hosted question-and-answer system utilising machine learning semantic analysis and other computational techniques including, in embodiments, to intelligently optimise query uniformity, automate answering and optimise answer quality.

In embodiments, the present system utilises a three-tier analysis process for 1) optimising query string uniformity, 2) automated answering and 3) optimising answer quality.

Specifically, the first tier relates to query semantic analysis employing trained query semantic correlation to intelligently correlate the received query string with earlier query strings so as to increase query string uniformity. The first tier may output an adapted more uniform query string corresponding with earlier query strings.

The second tier relates to answer semantic analysis employing trained answer semantic correlation to intelligently correlate the adapted query string output from the first tier with existing answers so as to allow for automated answering of query strings.

If no semantically appropriate matching existing answers are found, the third tier may employ user profile analysis employing trained user profile correlation to intelligently correlate the query semantic representation with user profiles and, for any matching profiles, sending the query string or the adapted query string to electronic devices associated with the matching profiles for answering so as to optimise answer quality.

As such, with the foregoing in mind, in accordance with one aspect, there is provided a system for the automated semantic analysis processing of query strings, the system comprising: an interface for receiving a query string from an electronic device; a query semantic correlator controller configured for: generating a query semantic representation of the query string; and correlating the query semantic representation with earlier query semantic representations, and if a matching query semantic representation is found, sending a query string associated with the matching query semantic representation to the electronic device; an answer semantic correlator controller configured for: correlating the query semantic representation with earlier answer semantic representations, and if a matching answer semantic representation is found, sending an answer string associated with the matching answer semantic representation to the electronic device; and a profile correlator controller configured for: if no matching answer semantic representation is found, correlating the query semantic representation with user profile data representations, and if a matching user profile data representation is found, sending the query string to an electronic device associated with a user profile associated with the matching user profile data representation.

The query semantic representation may be a language independent meaning.

Generating the query semantic representation of the query string may comprise a lexical hierarchy decomposition.

Generating the query semantic representation of the query string may comprise machine learning semantic analysis.

Machine learning semantic analysis may comprise at least one of Probabilistic latent semantic analysis (PLSA), latent semantic indexing, n-grams and hidden Markov models.

The query semantic correlator controller may comprise a supervised machine learning module trained utilising query training data comprising query semantic representations and wherein the supervised machine learning module may be configured for optimising a trained query semantic correlator.

The answer semantic correlator controller may comprise a supervised machine learning module trained utilising answer training data comprising answer semantic representations and wherein the supervised machine learning module may be configured for optimising a trained answer semantic correlator.

The profile correlator controller may comprise a supervised machine learning module trained utilising training data comprising profile data and wherein the supervised machine learning module may be configured for optimising a trained profile correlator.

The training data further may comprise query training data comprising query semantic representations.

The training data further may comprise answer training data comprising answer semantic representations.

The profile data may comprise location data and wherein the supervised machine learning module optimises according to location.

The profile data may comprise response statistics and wherein the supervised machine learning module optimises according to response statistics.

The profile data may comprise related query semantic representations and wherein the supervised machine learning module optimises according to related query semantics.

The profile data may comprise related answer semantic representations and wherein the supervised machine learning module optimises according to related answer semantics.

The profile data may comprise user profiling data and wherein the supervised machine learning module optimises according to user profiling.

The system may further comprise a readability analyser and wherein the readability analyser may be configured for rewording the query string to optimise readability.

The readability analyser employs readability analysis comprising at least one of ARI (automatic readability index) and Flesch-Kincaid readability metric analysis.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 2:
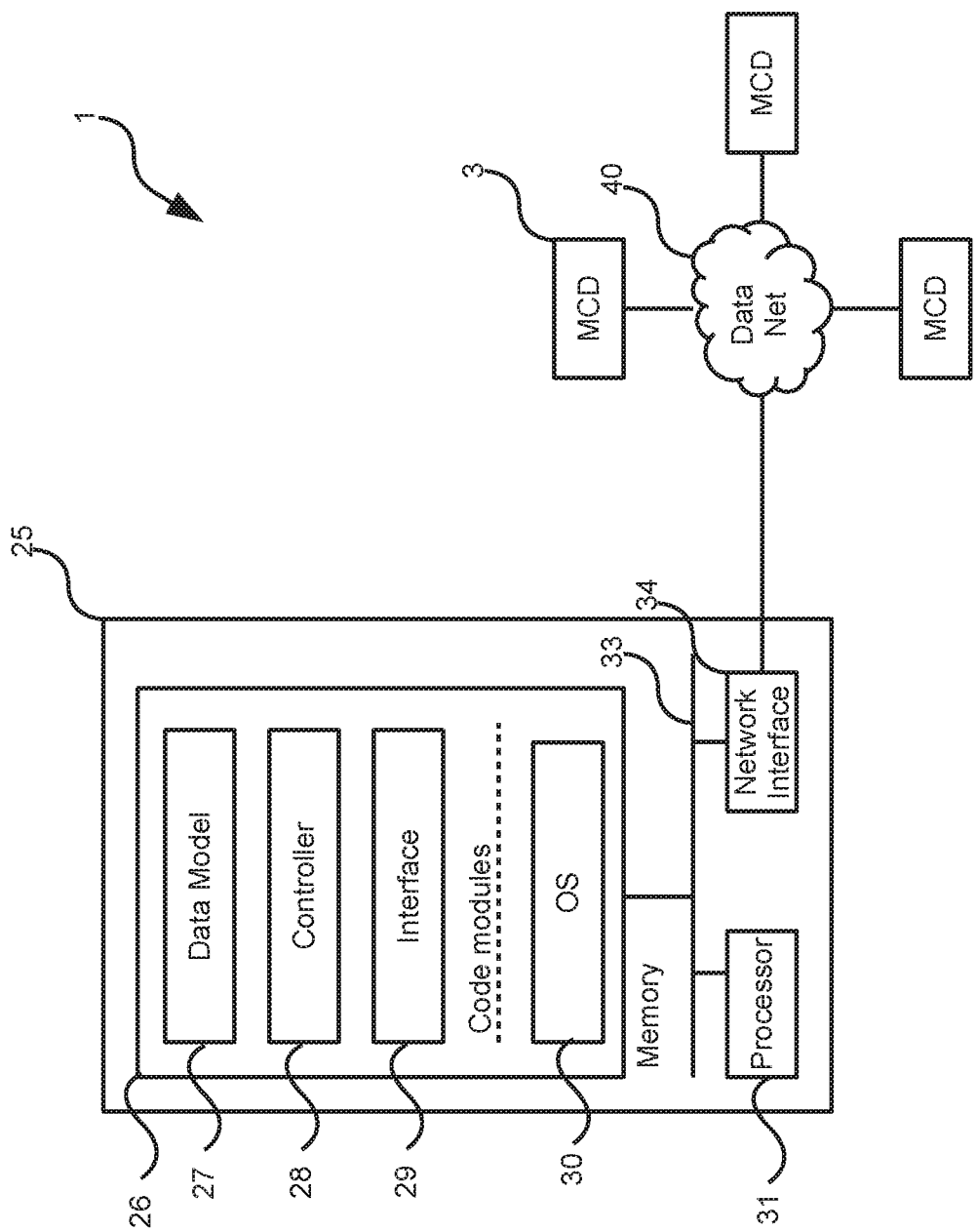
FIG. 2 shows a system for the automated semantic analysis processing of query strings in accordance with an embodiment.

FIG. 2 shows an exemplary computational architecture of system 1 for the automated semantic analysis processing of query strings.

Specifically, the embodiment shown in FIG. 2 shows an exemplary webserver architecture wherein the system 1 comprises a computer server 25 in operable communication with a plurality of electronic devices 3 across a computer data network.

The server 25 comprises a processor 31 for processing digital data. In operable communication with the processor 31 across a system bus 33 is a memory device 26. The memory device 26 is configured for storing digital data including computer program code instructions. As such, in use, the processor 35 is configured for fetching, decoding and executing these computer program code instructions from memory 26. In this regard, the memory device 26 may comprise an operating system 30 which is loaded during a bootstrap phase.

The computer program code instructions have been represented in FIG. 2 as being divided into various modules which are represented as a data model 27, controller 28 and interface 29 modules. In general terms, the interface module 25 performs user interface functionality, including those associated with electronic devices 3 in operable communication with the server 25.

Furthermore, the data model 27 represents the data and data structure within the database.

Furthermore, the controller 28 performs the various computer processing described herein including in interfacing the interface module 29 and the data model module 27.

The controller module 28 may comprise controller modules configured for the query semantic correlation, answer semantic correlation and profile correlation as will be described in further detail below.

The server 25 further comprises a network interface 34 for sending and receiving data across the computer data network 40.

The electronic devices 3 in operable communication with the server 25 may similarly comprise the aforedescribed computer componentry such as the processor 31, memory device 26 and the like. In embodiments, the electronic devices 3 may take the form of mobile computing devices, such as smart phones or the like. Furthermore, in embodiments, for implementing the functionality described herein, a software application "app" may be downloaded for installation and execution by each of the electronic devices 3.

In general terms, and as will be described in further detail below, the user may use an electronic device 3 to input a query string 2 which is then processed by the server 25 in the manner described herein.

Figure 1:
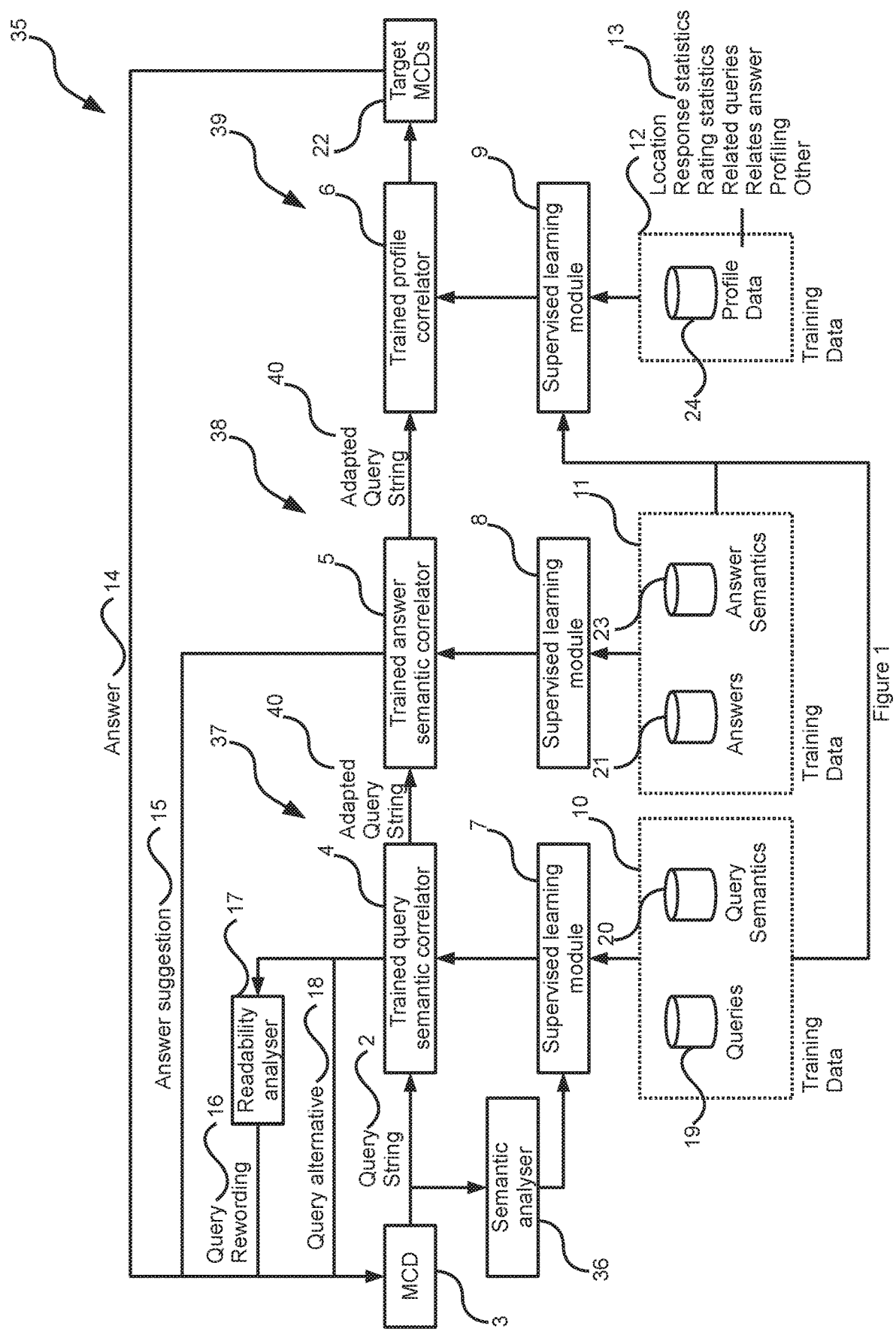
FIG. 1 shows exemplary data flow processing for the automated semantic analysis processing of query strings in accordance with an embodiment.

Having generally describe the exemplar computer architecture with reference to FIG. 2, reference is now made to FIG. 1 shown an exemplary data flow process 35 for the automated semantic analysis processing of query strings.

As can be seen, the processor 35 comprises a query string 2 being received from an electronic device 3.

Now, and as alluded to above, a first tier of the semantic analysis processing performed by the server 25 may comprise query semantic correlation processing. In general terms, the query semantic correlation processing is configured for enhancing query commonality and uniformity.

In this regard, the processing 35 may utilise a semantic analyser 36 to generate a query semantic representation of the query string 2.

Specifically, the semantic analyser 36 may relate to syntactic structures of the query string 2 in terms of discrete phrases, clauses, sentences, paragraphs and the like to infer a language independent meaning (the query semantic representation).

In embodiments, the semantic analyser 36 may relate individual words of the query string utilising an appropriate lexical hierarchy to infer the query semantic representation.

The semantic analyser 36 may utilise the machine learning for the semantic analysis which may include building semantic analysis structures that approximate concepts from a large set of documents so as to negate prior semantic understanding or user input. Such a machine learning may employ Probabilistic latent semantic analysis (PLSA), latent semantic indexing, n-grams, hidden Markov models and the like.

Having generated the query semantic representation utilising the semantic analyser 36, the processing 35 may utilise a query semantic correlator controller 37 to correlate the query semantic representation with earlier query semantics 20.

Specifically, previous query strings 19 may be stored within the data model 27, the query strings 19 stored in relation to associated query semantic representations 20.

As such, the query semantic correlator controller 37 is configured to correlate the semantic representation of the query string 2 with the earlier query semantic representations 20.

Such a correlation may employ statistical techniques such as clustering and the like. In alternative embodiments, such may employ supervised learning wherein a supervised learning module 7 is trained utilising the query semantic representations 20 to optimise a trained query semantic correlator 4.

As such, should a matching query semantic representation be identified from the query semantic representations 20 within the data model 27, a query alternative 18 may be sent to the electronic device 3. For example, using the electronic device, the user may pose a question and wherein, should the processing 35 identify an earlier semantically similar query, the earlier semantically similar query alternative 18 may be suggested to the user.

In embodiments, the processing 25 may reword the query string 20 so as to bring into alignment the semantically pertinent aspects of the query string 2 such as wherein a query string comprising "what's the best Mediterranean boat" is reworded to "what's the best Mediterranean cruise liner".

In embodiments, rewording of the query string 2 may employ a readability analyser 17 which may analyse the query string 2 in accordance with a readability index such as ARI (automatic readability index) Flesch-Kincaid readability metrics and the like. As such, a query rewording 16 may be calculated which optimises readability wherein, for example, the aforedescribed query string may be reworded to "Which Mediterranean cruise liner is best?".

As such, the query semantic correlator controller 37 may output and adapted query string 40 which, in embodiments as alluded to above, may comprise a query string replacement or a query string rewording wherein the adapted query string 40 has been intelligently optimised for query string commonality/uniformity and readability. Sometimes, the query string 2 may be modified if uniformity or readability cannot be optimised.

The second stage of the processing 35 may comprise utilisation of an answer semantic correlator controller 38 to seek to automate the answering of the query string 2.

As is represented in FIG. 2, answer strings 21 may be stored within the data model 27 in relation to associated answer semantic representations 23.

As such, the answer semantic correlator controller 38 is configured for seeking to correlate the query semantic representation with existing answer semantic representations 23. In general terms, the query semantic correlator controller 37 is seeking to automate the answering of the query string to utilising prior semantically appropriate answers.

In embodiments, the answer semantic correlator controller 38 may utilise a supervised machine learning module 8 which trains utilising training data 11 comprising prior answer semantic representations 23. The supervised machine learning module 8 is used to optimise a trained answer semantic correlator 5 which performs the correlation of the query semantic representation and the answer semantic representations 23 within the data model 27.

It should be noted that, in embodiments, the supervised machine learning module 8 may utilise any data relevant to the correlation of the answer semantic representations 23 and the query string semantic representation 2. For example, in one embodiment, the supervised learning module 8 may train in accordance with user answer quality ratings.

In further embodiments, other data may be utilised by the supervised learning module 8 so as to optimise answer suggestion appropriateness, including those optimised by location, user and the like.

If a matching answer semantic representation is found, an associated answer string suggestion 15 is sent to the electronic device 3.

However, if a matching answer semantic representation is not found, the processing 35 may utilise a profile correlator controller 39 for correlating the query string semantic representation with user profiles 24.

In general terms, if the processing 35 fails to find a semantically appropriate answer, the system 35 now seeks to find an appropriate user profile and associated user to answer the query string 2. Such is in distinction to existing platforms which merely publicly post the query string wherein, in accordance with this embodiment, the profile correlator controller 39 seeks to optimise the selection of an electronic device and associated user profile user for the answering of the query string 2 to optimise the quality of the answer.

In general terms, the query string 2 is conveyed only to appropriate user profiles wherein, for example, utilising the aforedescribed query string example, a processor 35 may intelligently identify user profiles being experts or having knowledge of Mediterranean cruises.

In embodiments, the profile correlator controller 39 a similar utilise a supervised machine learning module 9 which trains utilising training data which may include query training data 10, answer training data 11 and user profile training data 12. In this manner, the supervised learning module 9 optimises a trained profile correlator 6 which is then able to correlate the query string semantic representation with user profiles.

As can be seen from FIG. 1, the user profile training data 12 may comprise profile data 24 stored within the data model 27. Again, differing aspects of profile data 24 relevant for correlation purposes may be utilised by the profile correlator controller 39.

For example, in the embodiment shown, the profile data 24 may utilise location data 13 so as to be able to for example, query user profiles which are appropriate by location. In other words, queries may be posed only to user profiles within or having been within a specific locational region if appropriate.

The profile data 24 may further comprise response statistics which may include response frequency response times and number of responses wherein, profiles responding frequently and rapidly may be favoured.

In further embodiments, the profile data 24 may comprise feedback rating statistics wherein feedback ratings relating to the user profile of feedback ratings relating to a specific query semantic representation (i.e. area of expertise) associated with the user profile is utilised by the supervised learning module 9 such that, for example, only those user profiles having previously provided quality answers are favoured.

The profile data 24 may further comprise related queries wherein, for example, user profiles having previously posed query strings 2 comprising the same or similar query string semantic representations are favoured, being indicative of users having appropriate knowledge or interest.

Similarly, the profile data 24 may comprise related answers indicative of user profiles having appropriate knowledge or interest.

In further embodiments, the profile data 24 may comprise user profiling data 13 wherein user profiles are profiled to automate the identification of abstract concepts, such as user mood, user character and the like so as to be able to select appropriate user profiles accordingly.

Other profile data 24 may be similarly utilised.

As such, having identified at least one matching user profile, the processing 35 may send the query string 2 or the adapted query string 40 to at least one electronic device associated with the at least one matching user profile. As such, upon receipt of the electronic notification, the user associated with the matching user profile may input an answer 14 which is then sent electronically to the electronic device 3.

In embodiments, the processing 35 may comprise subset tiers such as comprising a subset of the query semantic correlator controller 37, answer semantic correlator controller 38 and profile correlator controller 39.

It should be noted that the answer string 14 may similarly be processed for optimising answer uniformity in the manner described above with reference to the query string uniformity optimisation.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system for the automated semantic analysis processing of query strings, the system comprising:
    an interface for receiving a query string from an electronic device;
    a query semantic correlator controller configured for:
        generating a query semantic representation of the query string; and
        correlating the query semantic representation with earlier query semantic representations, and if a matching query semantic representation is found, sending an alternative query string associated with the matching query semantic representation to the electronic device for selection;
    an answer semantic correlator controller configured for:
        correlating the query semantic representation with earlier answer semantic representations, and if a matching answer semantic representation is found, sending an answer string associated with the matching answer semantic representation to the electronic device; and
    a profile correlator controller configured for:
        if no matching answer semantic representation is found, correlating the query semantic representation with earlier answer semantic representations associated with user profile data representations, and if a matching user profile data representation is found, sending at least one of the query string and the alternative query string to an electronic device associated with a user profile associated with the matching user profile data representation.

2. A system as claimed in claim 1, wherein the query semantic representation is a language independent meaning.

3. A system as claimed in claim 1, wherein generating the query semantic representation of the query string comprises a lexical hierarchy decomposition.

4. A system as claimed in claim 1, wherein generating the query semantic representation of the query string comprises machine learning semantic analysis.

5. A system as claimed in claim 4, wherein machine learning semantic analysis comprises at least one of Probabilistic latent semantic analysis (PLSA), latent semantic indexing, n-grams and hidden Markov models.

6. A system as claimed in claim 1, wherein the query semantic correlator controller comprises a supervised machine learning module trained utilising query training data comprising query semantic representations and wherein the supervised machine learning module is configured for optimising a trained query semantic correlator.

7. A system as claimed in claim 1, wherein the answer semantic correlator controller comprises a supervised machine learning module trained utilising answer training data comprising answer semantic representations and wherein the supervised machine learning module is configured for optimising a trained answer semantic correlator.

8. A system as claimed in claim 1, wherein the profile correlator controller comprises a supervised machine learning module trained utilising training data comprising profile data and wherein the supervised machine learning module is configured for optimising a trained profile correlator.

9. A system as claimed in claim 8, wherein the training data further comprises query training data comprising query semantic representations.

10. A system as claimed in claim 8, wherein the training data further comprises answer training data comprising answer semantic representations.

11. A system as claimed in claim 8, wherein the profile data comprises location data and wherein the supervised machine learning module optimises according to location.

12. A system as claimed in claim 8, wherein the profile data comprises response statistics and wherein the supervised machine learning module optimises according to response statistics.

13. A system as claimed in claim 8, wherein the profile data comprises related query semantic representations and wherein the supervised machine learning module optimises according to related query semantics.

14. A system as claimed in claim 8, wherein the profile data comprises related answer semantic representations and wherein the supervised machine learning module optimises according to related answer semantics.

15. A system as claimed in claim 8, wherein the profile data comprises user profiling data and wherein the supervised machine learning module optimises according to user profiling.

16. A system as claimed in claim 1, further comprising a readability analyser and wherein the readability analyser is configured for rewording the query string to optimise readability.

17. A system as claimed in claim 16, wherein the readability analyser employs readability analysis comprising at least one of ARI (automatic readability index) and Flesch-Kincaid readability metric analysis.

* * * * *